US012794734B2

(12) United States Patent
Saif et al.

(10) Patent No.: US 12,794,734 B2
(45) Date of Patent: Nov. 10, 2026

(54) SPECTRUM SHARING IN MASSIVE MULTIPLE INPUT-MULTIPLE OUTPUT (MIMO) NETWORK

(71) Applicant: Telefonaktiebolaget LM Ericsson (publ), Stockholm (SE)

(72) Inventors: Rosa Saif, North York (CA); Zahra Pourgharehkhan, Nepean (CA); Shahram Shahbazpanahi, Whitby (CA); Majid Bavand, Ottawa (CA); Gary Boudreau, Kanata (CA); Israfil Bahceci, Kanata (CA); Ali Afana, Kanata (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 87 days.

(21) Appl. No.: 18/867,876

(22) PCT Filed: May 31, 2023

(86) PCT No.: PCT/IB2023/055605
§ 371 (c)(1),
(2) Date: Nov. 21, 2024

(87) PCT Pub. No.: WO2023/233335
PCT Pub. Date: Dec. 7, 2023

(65) Prior Publication Data

US 2025/0350499 A1 Nov. 13, 2025

Related U.S. Application Data

(60) Provisional application No. 63/347,763, filed on Jun. 1, 2022.

(51) Int. Cl.
*H04L 25/02* (2006.01)
*H04B 7/06* (2006.01)
(Continued)

(52) U.S. Cl.
CPC ....... *H04L 25/0202* (2013.01); *H04B 7/0617* (2013.01); *H04L 5/0044* (2013.01); *H04L 27/2656* (2013.01)

(58) Field of Classification Search
CPC ............... H04L 25/0202; H04L 5/0044; H04L 27/2656; H04B 7/0617; H04B 7/0456; H04W 16/14
See application file for complete search history.

(56) References Cited

U.S. PATENT DOCUMENTS

2009/0286480 A1* 11/2009 Cho ...................... H04W 16/14 455/62
2015/0036623 A1* 2/2015 Maaref ............ H04L 25/03891 370/329
2015/0126236 A1* 5/2015 Mukherjee ............ H04L 5/0032 455/522

FOREIGN PATENT DOCUMENTS

WO 2023/218427 A1 11/2023

OTHER PUBLICATIONS

International Search Report and Written Opinion dated Aug. 31, 2023 issued in PCT Application No. PCT/IB2023/055605 filed May 31, 2023, consisting of 17 pages.
(Continued)

*Primary Examiner* — David S Huang
(74) *Attorney, Agent, or Firm* — Weisberg I.P. Law, P.A.

(57) ABSTRACT

A method, system and apparatus for spectrum sharing in massive multiple input multiple output (MIMO) networks are disclosed. According to one aspect, a method in a secondary network node of a secondary network, the secondary network node configured to communicate with a plurality of secondary users, is provided. The method includes, performing channel estimates of primary users of a primary network during a learning phase that coincides with a training phase of the primary network. The method
(Continued)

also includes determining a beamformer and power allocation based at least in part on the channel estimates to maximize at least one of a weighted uplink data rate and a weighted downlink data rate subject to a constraint on a data rate of the primary network.

20 Claims, 9 Drawing Sheets

(51) Int. Cl.
*H04L 5/00* (2006.01)
*H04L 27/26* (2006.01)

(56) References Cited

OTHER PUBLICATIONS

Hao et al., Power Allocation for Massive MIMO Cognitive Radio Networks With Pilot Sharing Under SINR Requirements of Primary Users; IEEE Transactions on Vehicular Technology, vol. 67, No. 2, Feb. 2018, consisting of 13 pages.

Xie et al., A Full-Space Spectrum-Sharing Strategy for Massive MIMO Cognitive Radio Systems; IEEE Journal on Selected Areas in Communications, vol. 34, No. 10, Oct. 2016, consisting of 13 pages.

Chaudhari et al., QoS Aware Power Allocation and User Selection in Massive MIMO Underlay Cognitive Radio Networks; IEEE Transactions on Cognitive Communications and Networking, vol. 4, No. 2, Jun. 2018, consisting of 12 pages.

Kudathanthirige et al., Reverse TDD-Based Massive MIMO Systems With Underlay Spectrum Sharing; IEEE Transactions on Wireless Communications, vol. 18, No. 6, Jun. 2019, consisting of 19 pages.

Phan et al., Spectrum Sharing in Wireless Networks via QoS-Aware Secondary Multicast Beamforming; IEEE Transactions on Signal Processing, vol. 57, No. 6, Jun. 2009, consisting of 13 pages.

Semnani et al., Beamforming and Power Allocation in Overlay Cognitive Radio Network With imperfect CSI; 28th Iranian Conference on Electrical Engineering (ICEE2020); IEEE 2020, consisting of 7 pages.

Turki et al., Beamforming Design and Sum Rate Maximization for the Downlink of Underlay Cognitive Radio Networks, IEEE 2015, consisting of 6 pages.

* cited by examiner

SPECTRUM SHARING IN MASSIVE MULTIPLE INPUT-MULTIPLE OUTPUT (MIMO) NETWORK

CROSS-REFERENCE TO RELATED APPLICATIONS

This application is a Submission Under 35 U.S.C. § 371 for U.S. National Stage Patent Application of International Application No.: PCT/IB2023/055605, filed May 31, 2023 entitled, "SPECTRUM SHARING IN MASSIVE MULTIPLE INPUT-MULTIPLE OUTPUT (MIMO) NETWORKS," which claims priority to U.S. Provisional Application No. 63/347,763, filed Jun. 1, 2022, entitled "SPECTRUM SHARING IN MASSIVE MIMO NETWORKS," the entireties of both of which are incorporated herein by reference.

FIELD

The present disclosure relates to wireless communications, and in particular, to spectrum sharing in massive multiple input multiple output (MIMO) networks.

BACKGROUND

The Third Generation Partnership Project (3GPP) has developed and is developing standards for Fourth Generation (4G) (also referred to as Long Term Evolution (LTE)) and Fifth Generation (5G) (also referred to as New Radio (NR)) wireless communication systems. Such systems provide, among other features, broadband communication between network nodes, such as base stations, and mobile wireless devices (WD), as well as communication between network nodes and between WDs. Sixth Generation (6G) wireless communication systems are also under development.

Underlay spectrum sharing (USS) is a promising technology in cognitive radios to tackle the problem of spectrum scarcity in communication systems. The USS technology provides an unlicensed network (often referred to as the secondary network (SN)) with concurrent access to the spectrum of a licensed network (often referred to as the primary network (PN)) while guaranteeing the required quality of service (QOS) of the PN.

The USS technique uses massive multiple-input-multiple-output (MIMO) technology, where the network nodes of a network are equipped with a very large number of antennas. The massive MIMO technology allows many users in the network to be served using the same time-frequency resources, thereby improving the spectral efficiency of the network.

Several studies have focused on exploiting the advantages of the massive MIMO techniques in USS cognitive radio systems. In one known method, downlink (DL) communication of a system that includes a multi-cell multi-user PN and a single-cell multi-user SN, is presented. The system uses massive MIMO technology along with a matched filter (MF) precoding at both the primary base station (PBS) and the secondary base station (SBS). This known method addresses the problem of power allocation optimization problem (OP) at the SN by maximizing the DL sum-rate of the SN while satisfying each PU's quality of service (QOS). This technique results in a reliable performance only when the numbers of PBS antennas and SBS antennas simultaneously increase without bound. In addition, in this scheme, both the PN and the SN are required to share their users' channel state information (CSI) in addition to their users' positions. Also, using this method, the number of secondary users (SUs) served by the SBS is limited to the number of inactive primary users (PUs), yielding a reduction of spectral efficiency in the SN.

A setup that includes a peer-to-peer PN and a multi-cell multi-user massive MIMO SN equipped with two SBSs in each cell has been considered. For such a system, the number of SUs served by the SBSs is maximized by a DL scheduling strategy. This scheme relies on estimating the angular information of both the PUs and SUs and on UL (DL) training at the SBS (SUs). This scheme may yield a high latency in the SN, thereby degrading the SN spectral efficiency. Moreover, deploying two SBSs per cell increases the implementation cost of the network. A multi-user massive MIMO SN and a multi-pair PN have been considered. Assuming imperfect CSI of the PUs and the SUs at the SBS, the problem of joint power allocation and maximization of the number of the SUs served by the SBS in the DL transmission remains to be solved. A modified zero-forcing (MZF) has been considered which allows the SBS to work in the spatial spectrum holes of the channels of the PUSs, thereby protecting the PUs.

Time-division duplexing (TDD) mode solutions have been considered. Relying on channel reciprocity, TDD results in less training overhead compared to the frequency-division duplexing (FDD) mode. However, utilizing TDD causes more interference in co-existing networks because of pilot contamination. To tackle this issue, a reverse TDD (rTDD) is employed, where the co-existing networks synchronously operate in opposite transmission directions. In other words, unlike conventional TDD, when one network is in an UL phase, the other one is in a DL phase and vice versa. The performances of the TDD and the rTDD schemes in massive MIMO USS setups that include a multi-cell multi-user PN and a multi-cell multi-user SN have been compared. To do so, assuming imperfect CSI of the SUs (PUs) at the SBS (PBS), the UL and DL achievable rates of the PN and those of the SN may be derived when both PBS and SBS employ the conventional ZF beamformer. Using the rTDD protocol, the SN performance and the PN performance are asymptotically independent. However, in this protocol, designing the PN parameters, such as the lengths of the UL/DL intervals, depends on the SN parameters.

USS performance has been studied for UL and DL transmission. Also, some of the available schemes only focus on the SN performance using the USS approach. One known scheme hinges on the channel estimation errors. Moreover, in this scheme, the PN parameters, such as the lengths of the UL/DL intervals, depend on the SN parameters. Indeed, the PN operating parameters have to be changed by changing the SN parameters, thereby imposing a heavy burden on the PN in practice. Furthermore, in some known methods, the PN performance is significantly degraded in the SN presence as they do not fully protect the PN. In addition, despite meeting the PN QOS, the existing approaches in the conventional USS are not able to entirely protect the SN performance from the interference caused by the PN. Also, the existing methods require considerable cooperation between the PN and the SN for obtaining the PBS CSI, locations, allocated powers, etc. The required cooperation between the PN and the SN is not practical for implementations using USS techniques. Regarding all the aforementioned points, PN and SN performances in both UL and DL with the aim of protecting the PN from the SN presence and vice versa have not been studied.

SUMMARY

Some embodiments advantageously provide methods and network nodes for spectrum sharing in massive multiple input multiple output (MIMO) networks.

In some embodiments, the performances of both the primary network (PN) and the secondary network (SN) in both uplink (UL) and downlink (DL) are considered in order to protect the PN from the SN presence and vice versa.

Some embodiments solve the problem of underlay spectrum sharing (USS) in a MIMO secondary network to access the same licensed spectrum of a multi-user massive MIMO primary network. Assume both primary and secondary networks are equipped with beamforming technologies and that they both provide service to single-antenna users. The secondary network's beamforming and power allocation schemes in DL and UL may be configured to maximize the weighted achievable uplink and downlink sum-rates of the secondary network while at least partially protecting the primary network from the secondary network's presence. A solution is disclosed that protects the secondary network from the primary network's interference, taking advantage of massive MIMO technology to enable the secondary network to work in the spatial spectrum holes of the primary network. To this end, a zero-forcing type beamformer may be employed at the secondary base station. More specifically, a solution is disclosed in which the primary and secondary networks' data rates, unlike known schemes, are not highly dependent on the channel estimation errors. To do so, a structure for the secondary network's communication frame is used that includes a learning phase. In the learning phase, the secondary network's nodes do not transmit and listen to the primary users with the aim of estimating the primary users' channels. The SN frame avoids pilot contamination between the primary and secondary networks while minimizing communication exchange between the primary and secondary networks. Moreover, to further mitigate the interference between the two networks, reverse time-division-duplexing (rTDD) may be employed and referred to as Scenario B. The performance of rTDD is compared to the performance of conventional time-division-duplexing (TDD), referred to as Scenario A.

For both Scenarios A and B described above, the transmit and receive beamformers of the secondary network node may be jointly designed with the secondary network's power allocation schemes in both uplink and downlink phases. To do so, two optimization problems (corresponding to Scenarios A and B) may be formulated to maximize the secondary network's sum-rates while considering the power budgets of the secondary network's nodes and attempting to guarantee the given data-rates of the primary users. The optimization problem corresponding to each scenario can be decomposed into two independent optimization problems: one corresponds to the secondary network's uplink and the other one corresponds to the secondary network's downlink.

To solve the optimization problem corresponding to the secondary network's uplink in Scenario A (TDD), the receive beamformers at the secondary base station are configured such that the secondary base station can protect itself from the primary users. To this end, at the secondary base station, a modified zero-forcing beamformer is configured that relies on the primary users' CSI and the secondary users' CSI. The secondary users' power allocation schemes are determined via a computationally efficient convex optimization problem. For the secondary network's downlink in Scenario A, a zero-forcing beamforming approach is used to configure the secondary base station's transmit beamformers, such that the secondary base station is able to protect the primary users while maximizing the achievable sum-rate of the SN. The secondary network may be configured to work in the primary network's spatial spectrum holes. Exploiting the modified zero-forcing design, the secondary base station's power allocation strategy may employ a water-filling type of algorithm.

To solve the optimization problem corresponding to the secondary network's uplink in Scenario B (rTDD), the receive beamformers at the secondary base station may be configured such that the secondary base station can protect itself from the primary base station. To this end, at the secondary base station, a zero-forcing beamforming method may be employed that relies on the knowledge of the subspace of the primary-secondary base station channel matrix in addition to the channels between the secondary base station and all secondary users. As a result, this zero-forcing method does not require downlink training, leading to a significant reduction in the training overheads of the primary network and the secondary network. Therefore, the beamformers disclosed herein May substantially improve the spectral efficiency of both primary and secondary networks. The zero-forcing method disclosed herein determines a power allocation scheme for the secondary network users through a convex optimization problem. In the secondary network's downlink in Scenario B (using rTDD), a subspace-based zero-forcing is used for the transmit beamformers of the secondary base station which enables the secondary base station to fully protect the primary base station. Based on such transmit beamformers, an optimum power allocation scheme of the secondary base station leads to a water-filling type of algorithm.

In some embodiments, the data rates of a multi-user SN are maximized by exploiting the spatial spectrum holes of a multi-user PN, using a massive MIMO-based USS scheme. Some embodiments may achieve one or more of the following objectives:

- A rTDD (Scenario B) communication mode for the SN achieves better performance in terms of maximizing the SN and PN sum-rates, as compared to the TDD (Scenario A) mode. The communication modes for the SN, unlike the existing ones, mitigate the sensitivity of the SN and PN performances to the channel estimations errors. To achieve this, a learning phase at the SN may be employed;
- An optimization problems (OP) for the SN in both the UL and DL is formulated to design the SBS beamformers and the SN power allocation strategies by maximizing the SN data rates while guaranteeing the PN QoS. Power budgets of the SN in the Ops to attain green communication are considered;
- The SN receive beamformers in both TDD and rTDD modes may be designed such that the SBS is able to protect itself from the interference caused by the PN nodes;
- The SN transmit beamformers in both TDD and rTDD modes may be configured such that the SBS protects the PN nodes, thereby enabling the PN to work independently from the presence of the secondary network. Employing these beamformers does not require an infinite number of antennas at the PBS and SBS as in some known methods. Some embodiments are applicable in MIMO systems with a finite number of base station antennas. Nevertheless, performance may be improved as the numbers of network node antennas approaches infinity;

To obtain the CSI of the PN nodes at the SBS, which may be used to design (configure) the beamformers, solutions are presented that reduce the training costs of the PN and the SN;

In some embodiments, minimal cooperation between the PN and the SN may be employed to realize the USS technique; and/or In some embodiments, the PN design parameters are not meant to change by changing the SN design parameters, such as the number of secondary users (SUs).

According to one aspect, a secondary network node in a secondary network is provided. The secondary network node includes processing circuitry configured to perform channel estimates for primary users of a primary network during a learning phase that coincides with a training phase of the primary network, and determine a beamformer and power allocation based at least in part on the channel estimates to maximize at least one of a weighted uplink data rate and a weighted downlink data rate subject to a constraint on a data rate of the primary network.

According to this aspect, in some embodiments, the processing circuitry is further configured to perform reverse time division duplexing, rTDD. In some embodiments, determining the beamformer and power allocation is based at least in part on information about a subspace of a channel matrix corresponding to a channel between the primary network and the secondary network. In some embodiments, determining the beamformer and power allocation includes determining the power allocation based at least in part on performing a convex optimization procedure. In some embodiments, determining the power allocation includes performing a water-filling procedure. In some embodiments, determining the beamformer and power allocation is performed without downlink training. In some embodiments, maximizing at least one of the weighted uplink data rate and the weighted downlink data rate is based at least in part on information about spectrum holes of the primary network. In some embodiments, maximizing at least one of the weighted uplink data rate and the weighted downlink data rate is performed subject to a first constraint on interference by primary users of the primary network. In some embodiments, maximizing at least one of the weighted uplink data rate and the weighted downlink data rate is performed subject to a second constraint on a number of antennas of the secondary network node being greater than a sum of a number of secondary users and primary users. In some embodiments, estimating and determining is performed without receiving channel information from a primary network node of the primary network.

According to another aspect, a method implemented in a secondary network node of a secondary network is provided. The secondary network node is configured to communicate with a plurality of secondary users. The method includes performing channel estimates for primary users of a primary network during a learning phase that coincides with a training phase of the primary network. The method also includes determining a beamformer and power allocation based at least in part on the channel estimates to maximize at least one of a weighted uplink data rate and a weighted downlink data rate subject to a constraint on a data rate of the primary network.

According to this aspect, in some embodiments, the method includes performing reverse time division duplexing, rTDD. In some embodiments, determining the beamformer and power allocation is based at least in part on information about a subspace of a channel matrix corresponding to a channel between the primary network and the secondary network. In some embodiments, determining the beamformer and power allocation includes determining a power allocation based at least in part on performing a convex optimization procedure. In some embodiments, determining the power allocation includes performing a water-filling procedure. In some embodiments, determining a beamformer and power allocation is performed without downlink training. In some embodiments, maximizing at least one of the weighted uplink data rate and the weighted downlink data rate is based at least in part on information about spectrum holes of the primary network. In some embodiments, maximizing at least one of the weighted uplink data rate and the weighted downlink data rate is performed subject to a first constraint on interference by primary users of the primary network. In some embodiments, maximizing at least one of the weighted uplink data rate and the weighted downlink data rate is performed subject to a second constraint on a number of antennas of the secondary network node being greater than a sum of a number of secondary users and primary users. In some embodiments, estimating and determining is performed without receiving channel information from a primary network node of the primary network.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
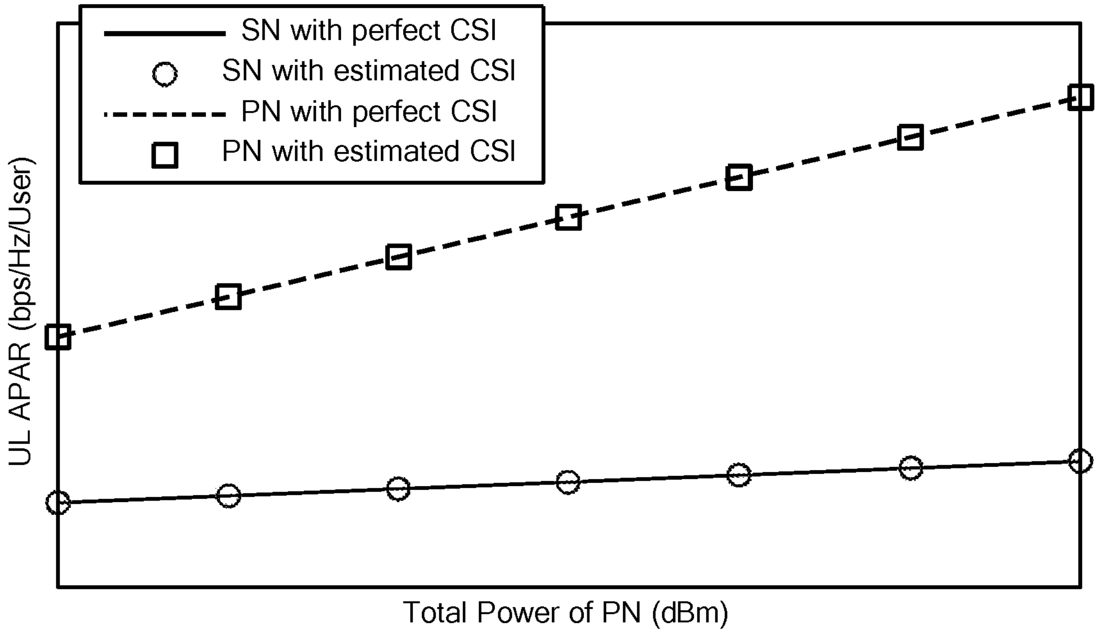
FIG. 1 a graph of average per-user achievable rate (APAR) of a primary network (PN) and a secondary network (SN) versus total power allocated to the PN with perfect CSI and estimated CSI.

Before describing in detail example embodiments, it is noted that the embodiments reside primarily in combinations of apparatus components and processing steps related to spectrum sharing in massive multiple input multiple output (MIMO) networks. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node included in a radio network which may further include any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also include test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IoT) device, etc.

Also, in some embodiments the generic term "radio network node" is used. It can be any kind of a radio network node which may include any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments provide spectrum sharing in massive multiple input multiple output (MIMO) networks.

A massive MIMO-base USS approach is disclosed herein that provides a low complexity solution to the problem of maximizing the data rates of a secondary network (SN) while meeting the given data rates of the primary network (PN). The SN and PN performances in both UL and DL phases are considered. The effects of the PN (SN) on the SN (PN's) overall performance in each communication frame may also be considered. By maximizing the SN data rates, the SBS's beamformers and the SN power allocation schemes are jointly designed. To do so, an SN communication frame is employed that includes a learning phase. In the learning phase, which coincides with the training phase of the PN, the SN is quiet and listens to the PN to protect the PN training performance while obtaining the required information about the PN nodes such as their CSI. Using this frame structure, pilot contamination between the PN and the SN is avoided. Therefore, the PN and the SN performances are slightly sensitive to the channel estimation errors, as shown in FIG. 1. Also, exploiting the learning phase of the SN reduces the cooperation of the PN with the SN required to obtain the CSI of the PN nodes at the SN nodes.

Figure 2:
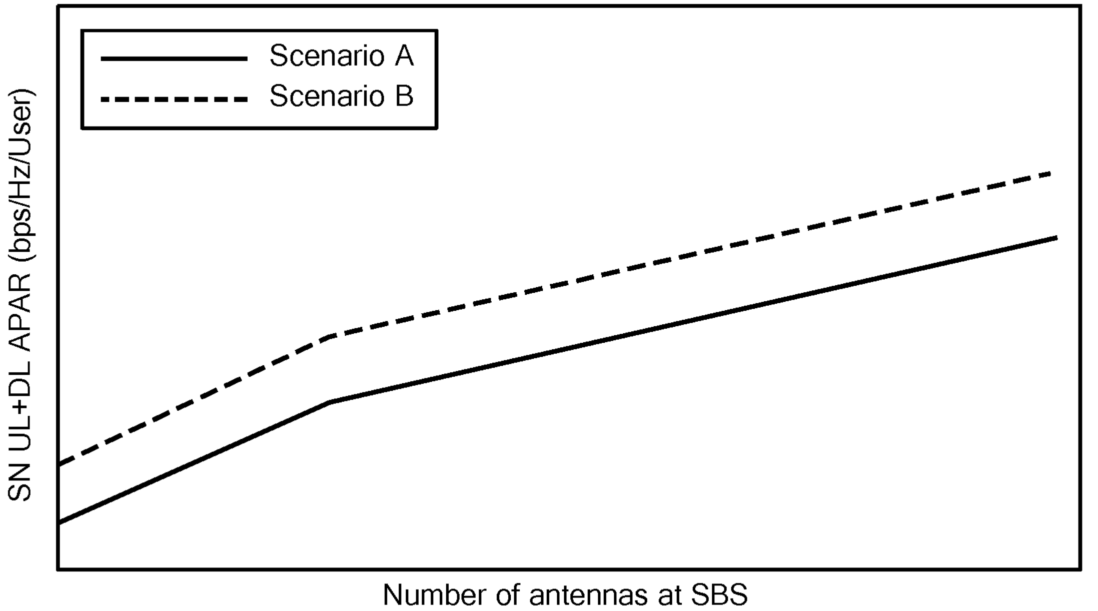
FIG. 2 is a graph of uplink (UL) plus downlink (DL) APAR versus the number of antennas of the secondary base station for two scenarios A and B.

Moreover, in order to alleviate the interference between the PN and the SN, a modified rTDD mode is used and its performance is compared with a modified TDD mode. The TDD (referred to as Scenario A) and rTDD (referred to as Scenario B) modes include the learning phase as compared to known methods. In order to implement Scenario A, the SN may obtain global CSI of the PN nodes which may either be unavailable in practice or require DL training of the PN. To overcome this issue, which is common in the existing USS schemes, an approximation for the CSI is proposed in some embodiments. However, this approximation may result in either degrading the SN data rates or solving an infeasible optimization problem. As disclosed herein, implementing Scenario B does not require global CSI or an approximation, and thus, does not suffer from infeasibility in the corresponding OPs. Realization of the underlay spectrum sharing in Scenario B requires less cooperation between the PN and the SN, and lower training costs, in comparison with Scenario A, as well as in comparison to known methods. This is due to the fact that in Scenario B, the SN estimates CSI without involving the PN in a training process and without any mathematical approximation or relaxation. Also, as shown in FIG. 2, Scenario B mostly outperforms Scenario A in terms of maximizing the data rates of the SN.

Figure 3:
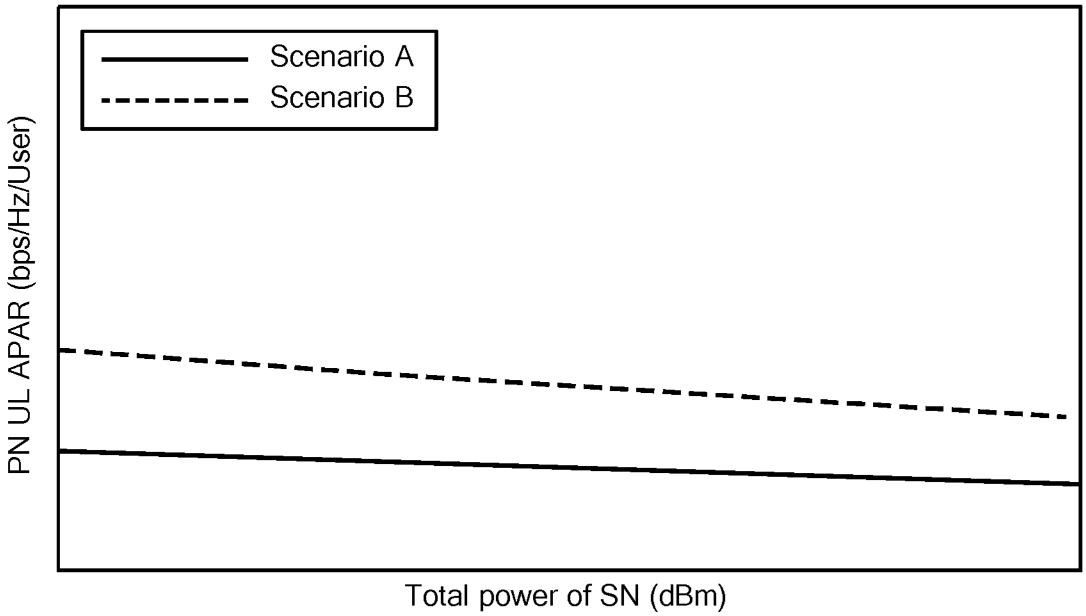
FIG. 3 is a graph of UL APAR of the PN versus total power allocated to the SN in Scenarios A and B.

To design the receive and transmit beamformers of the SBS in both scenarios, a method to enable the SBS to work in the spatial spectrum holes of the PN is disclosed. In other words, the SBS is able to protect the PN nodes from its transmitted signals while protecting itself from the signals transmitted by the PN nodes. As a result, the PN performance is only slightly affected by changing the SN parameters. See FIG. 3. More specifically, the beamformers in Scenario B may rely on the knowledge of the subspace of the SBS-PBS channel matrix in addition to the SBS-SUs channel matrices. These subspace-based beamformers may mitigate the training overhead of both networks and increase the degrees of freedom available to the SBS to communicate with the SUs.

Figure 4:
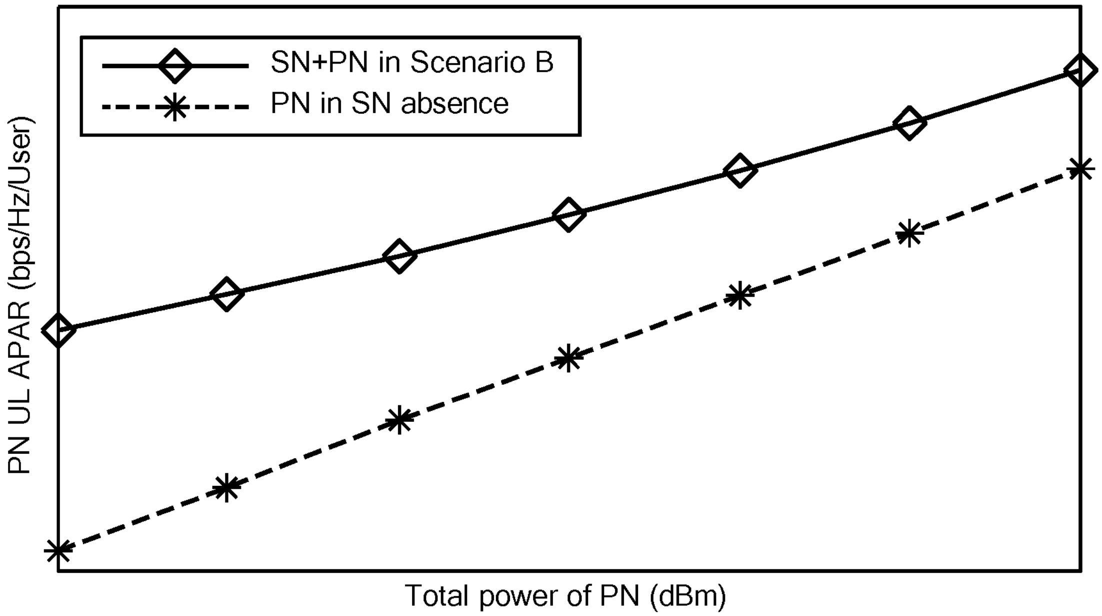
FIG. 4 is a graph of UL plus DL APARs for the PN plus SN and for the PN, only, versus total power of the PN for Scenario B.

Numerical results show that the data rate of the whole network (PN+SN) is higher than that of a network (only PN without SN). As shown in FIG. 4, the overall data rate of the network may be improved by using the disclosed USS approach.

Based on such beamformers, the optimum power allocation schemes of the SBS lead to either a water-filling type of algorithm or solving a computationally efficient convex OP.

Scenario B achieves a higher data rate with the same consumed power, compared to Scenario A, leading to green communication in 5G and beyond. It is also noted that the graphs of FIGS. 1-4 are provided to show examples of relative performance advantages of the given solutions.

Figure 5:
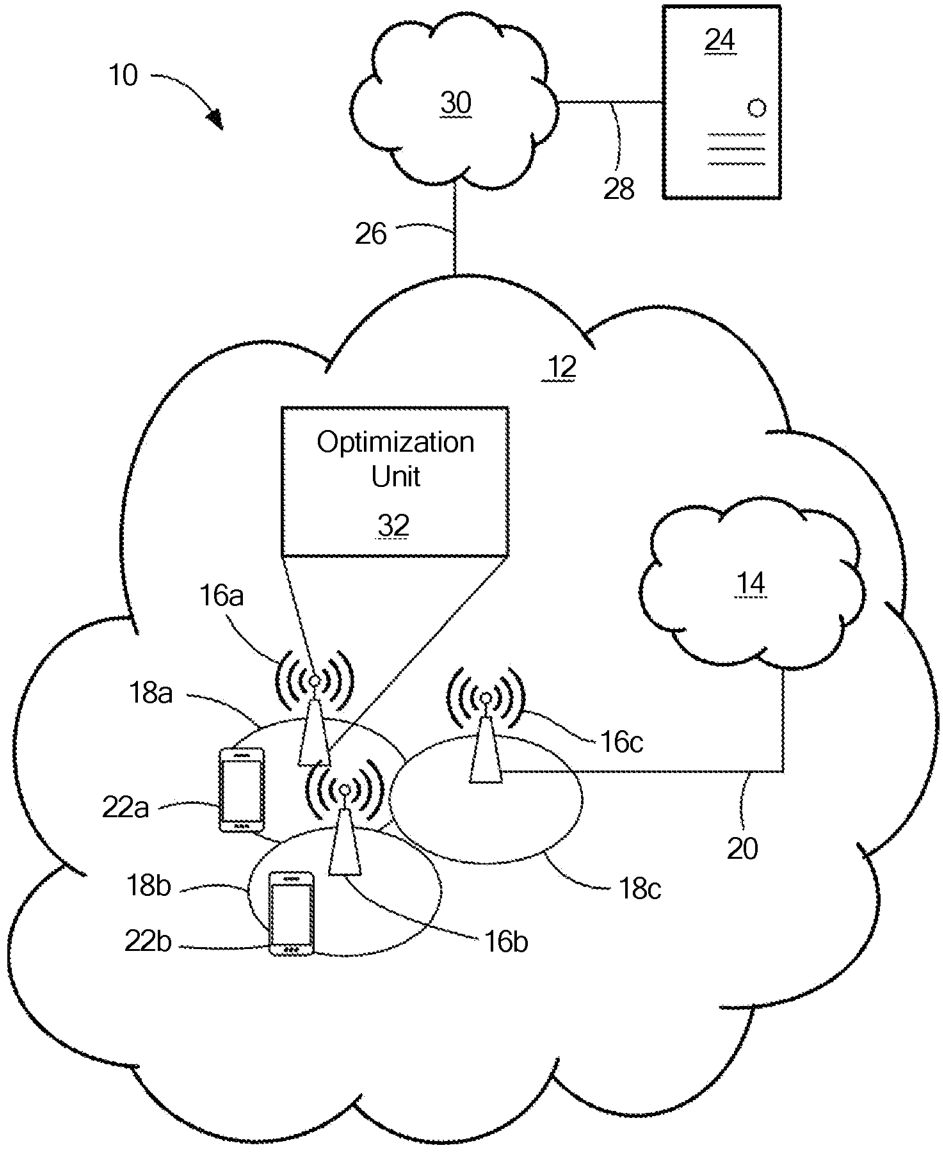
FIG. 5 is a schematic diagram of an example network architecture illustrating a communication system connected via an intermediate network to a host computer according to the principles in the present disclosure.

There is shown in FIG. 5 a schematic diagram of a communication system 10, according to an embodiment, such as a 3GPP-type cellular network that may support standards such as LTE and/or NR (5G), which includes an access network 12, such as a radio access network, and a core network 14. The access network 12 includes a plurality of network nodes 16*a*, 16*b*, 16*c* (referred to collectively as network nodes 16), such as NBs, eNBs, gNBs or other types of wireless access points, each defining a corresponding coverage area 18*a*, 18*b*, 18*c* (referred to collectively as coverage areas 18). Each network node 16*a*, 16*b*, 16*c* is connectable to the core network 14 over a wired or wireless connection 20. In some embodiments, a network node 16*a* may be in a primary network (PN) and be referred to herein as a primary base station (PBS) 16*a*. In some embodiments, a network node 16*b* may be in a secondary network (SN) and be referred to herein as a secondary base station (SBS) 16*b*. Note that the secondary network may be served by the same core network 14 as the primary network or by an entirely different core network 14.

A first wireless device (WD) 22*a* located in coverage area 18*a* is configured to wirelessly communicate with, or be paged by, the corresponding network node 16*a*. A set of WDs 22*a* may be served by the PBS 16*a* and be referred to herein as primary users (PUs). A second WD 22*b* in coverage area 18*b* is in wireless communication with the corresponding network node 16*b*. Note that the coverage area 18*a* and the coverage area 18*b* may at least partially overlap. A set of WDs 22*b* may be served by the SBS 16*a* and be referred to herein as secondary users (SUs) 22*b*. While a plurality of WDs 22*a*, 22*b* (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may include two or more sub-networks (not shown).

The communication system of FIG. 5 as a whole enables connectivity between one of the connected WDs 22*a*, 22*b* and the host computer 24. The connectivity may be described as an over-the-top (OTT) connection. The host computer 24 and the connected WDs 22*a*, 22*b* are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22*a*. Similarly, the network node 16 need not be aware of the future routing of an outgoing uplink communication originating from the WD 22*a* towards the host computer 24.

A network node 16 is configured to include an optimization unit 32 which is configured to determine a beamformer and power allocation to maximize at least one of a weighted uplink data rate and a weighted downlink data rate subject to a constraint on a data rate of the primary network, determining the beamformer and power allocation being based at least in part on the channel estimates.

Example implementations, in accordance with an embodiment, of the WD 22, network node 16 and host computer 24 discussed in the preceding paragraphs will now be described with reference to FIG. 6. In a communication system 10, a host computer 24 includes hardware (HW) 38 including a communication interface 40 configured to set up and maintain a wired or wireless connection with an interface of a different communication device of the communication system 10. The host computer 24 further includes processing circuitry 42, which may have storage and/or processing capabilities. The processing circuitry 42 may include a processor 44 and memory 46. In particular, in addition to or instead of a processor, such as a central processing unit, and memory, the processing circuitry 42 may include integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may include any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may include integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may include any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include an optimization unit 32 which is configured to determine a beamformer and power allocation to maximize at least one of a weighted uplink data rate and a weighted downlink data rate subject to a constraint on a data rate of the primary network, determining the beamformer and power allocation being based at least in part on the channel estimates.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may include integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may include any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further include software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22.

Figure 6:
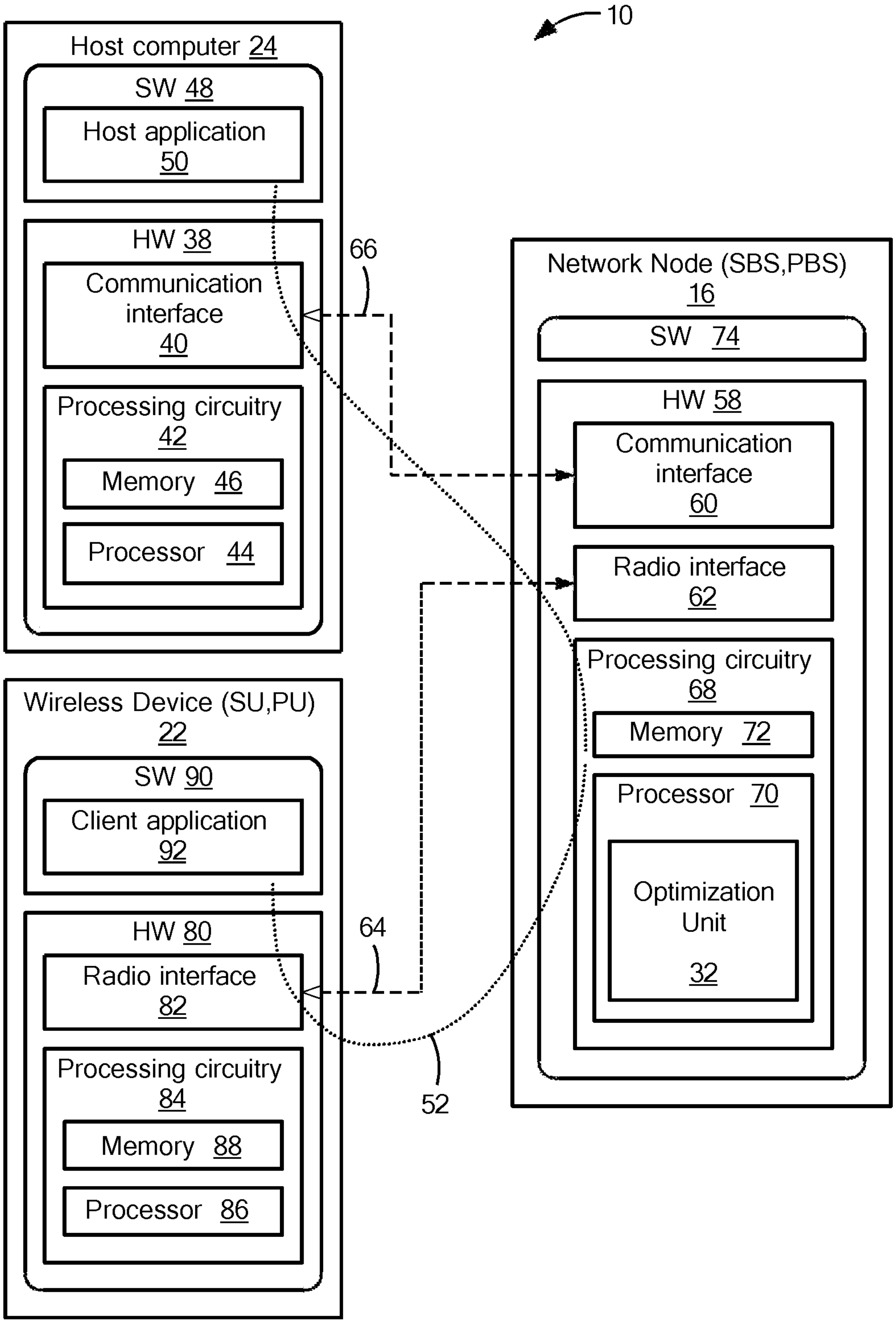
FIG. 6 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 6 and independently, the surrounding network topology may be that of FIG. 5.

In FIG. 6, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors, etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62.

In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or includes a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 5 and 6 show various "units" such as optimization unit 32 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 7:
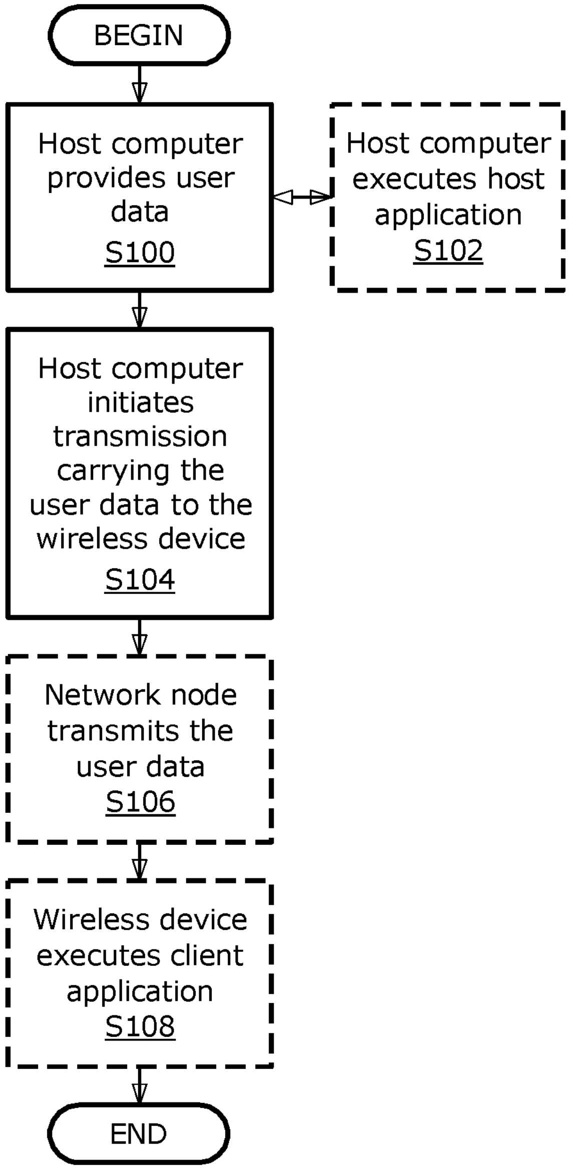
FIG. 7 is a flowchart illustrating example methods implemented in a communication system including a host computer, a network node and a wireless device for executing a client application at a wireless device according to some embodiments of the present disclosure.

FIG. 7 is a flowchart illustrating an example method implemented in a communication system, such as, for example, the communication system of FIGS. 5 and 6, in accordance with one embodiment. The communication system may include a host computer 24, a network node 16 and a WD 22, which may be those described with reference to FIG. 6. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

Figure 8:
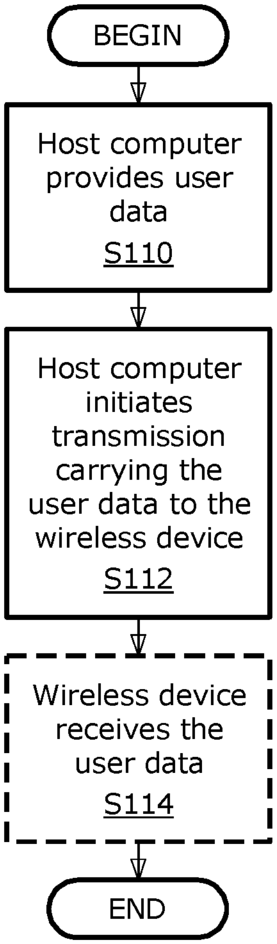
FIG. 8 is a flowchart illustrating example methods implemented in a communication system including a host computer, a network node and a wireless device for receiving user data at a wireless device according to some embodiments of the present disclosure.

FIG. 8 is a flowchart illustrating an example method implemented in a communication system, such as, for example, the communication system of FIG. 5, in accordance with one embodiment. The communication system may include a host computer 24, a network node 16 and a WD 22, which may be those described with reference to FIGS. 5 and 6. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figure 9:
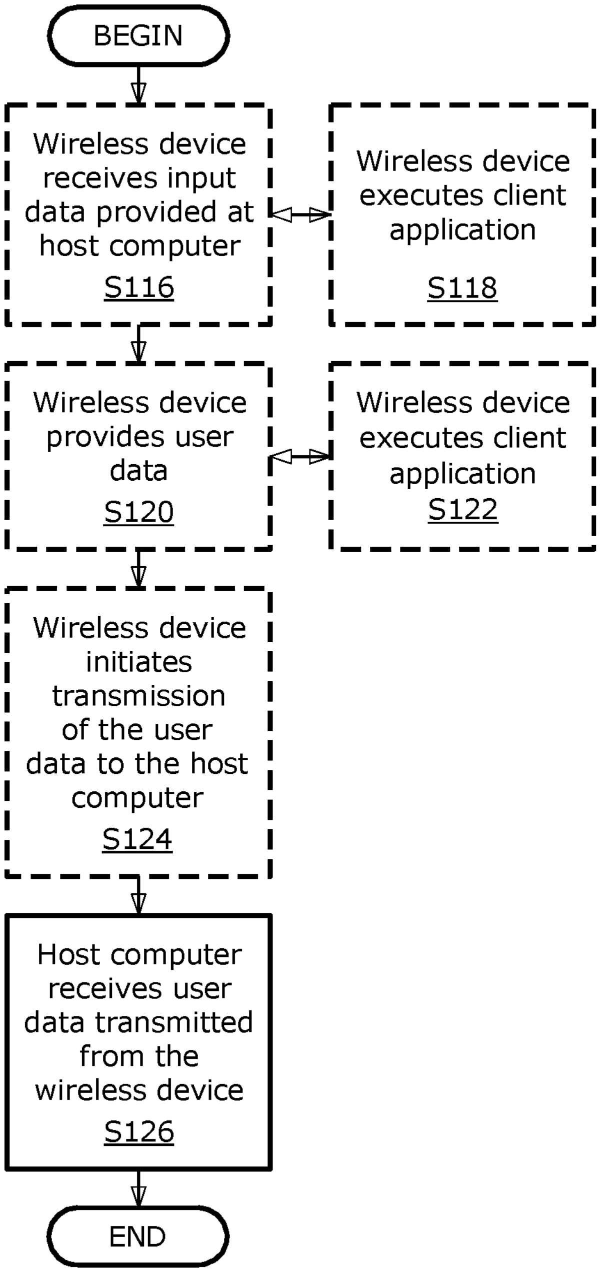
FIG. 9 is a flowchart illustrating example methods implemented in a communication system including a host computer, a network node and a wireless device for receiving user data from the wireless device at a host computer according to some embodiments of the present disclosure.

FIG. 9 is a flowchart illustrating an example method implemented in a communication system, such as, for example, the communication system of FIG. 5, in accordance with one embodiment. The communication system may include a host computer 24, a network node 16 and a WD 22, which may be those described with reference to FIGS. 5 and 6. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

Figure 10:
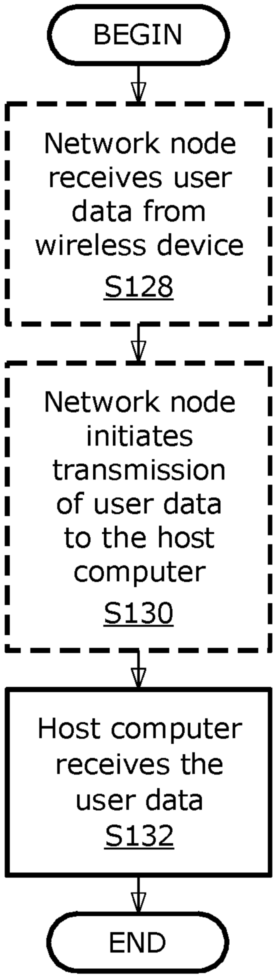
FIG. 10 is a flowchart illustrating example methods implemented in a communication system including a host computer, a network node and a wireless device for receiving user data at a host computer according to some embodiments of the present disclosure.

FIG. 10 is a flowchart illustrating an example method implemented in a communication system, such as, for example, the communication system of FIG. 5, in accordance with one embodiment. The communication system may include a host computer 24, a network node 16 and a WD 22, which may be those described with reference to FIGS. 5 and 6. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 11:
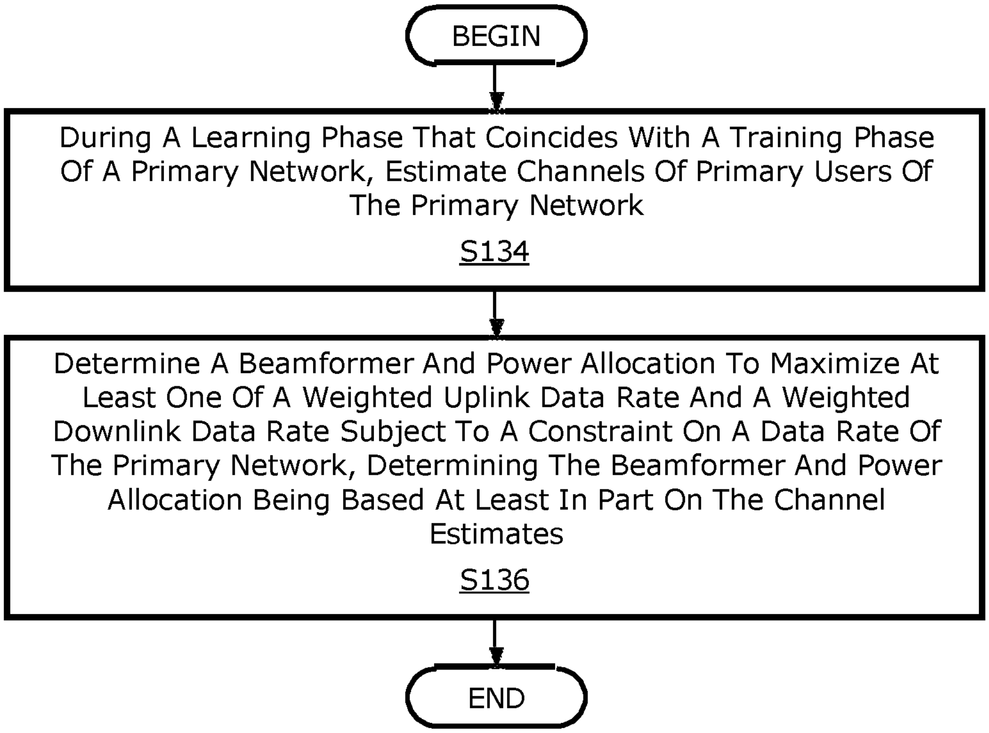
FIG. 11 is a flowchart of an example process in a network node for spectrum sharing in massive multiple input multiple output (MIMO) networks.

FIG. 11 is a flowchart of an example process in a network node 16 for spectrum sharing in massive multiple input multiple output (MIMO) networks. One or more blocks described herein may be performed by one or more elements of network node 16 such as by one or more of processing circuitry 68 (including the optimization unit 32), processor 70, radio interface 62 and/or communication interface 60. Network node 16 such as via processing circuitry 68 and/or processor 70 and/or radio interface 62 and/or communication interface 60 is configured to during a learning phase that coincides with a training phase of a primary network, estimate channels of primary users of the primary network (Block S134). The process also includes determining a beamformer and power allocation to maximize at least one of a weighted uplink data rate and a weighted downlink data rate subject to a constraint on a data rate of the primary network, determining the beamformer and power allocation being based at least in part on the channel estimates (Block S136).

In some embodiments, the process also includes performing reverse time division duplexing, rTDD. In some embodiments, determining the beamformer and power allocation is based at least in part on information about a subspace of a channel matrix corresponding to a channel between the primary network and the secondary network. In some embodiments, determining the beamformer and power allocation includes determining a power allocation based at least in part on performing a convex optimization procedure. In some embodiments, determining the power allocation includes performing a water-filling procedure. In some embodiments, determining a beamformer and power allocation is performed without downlink training. In some embodiments, maximizing at least one of a weighted uplink data rate and a weighted downlink data rate is based at least in part on information about spectrum holes of the primary network. In some embodiments, maximizing at least one of a weighted uplink data rate and a weighted downlink data rate is performed subject to a constraint on interference by primary users of the primary network. In some embodiments, maximizing at least one of a weighted uplink data rate and a weighted downlink data rate is performed subject to a constraint on a number of antennas of the secondary network node being greater than a sum of a number of secondary users and primary users. In some embodiments, estimating and determining is performed without receiving channel information from a primary network node of the primary network.

Figure 12:
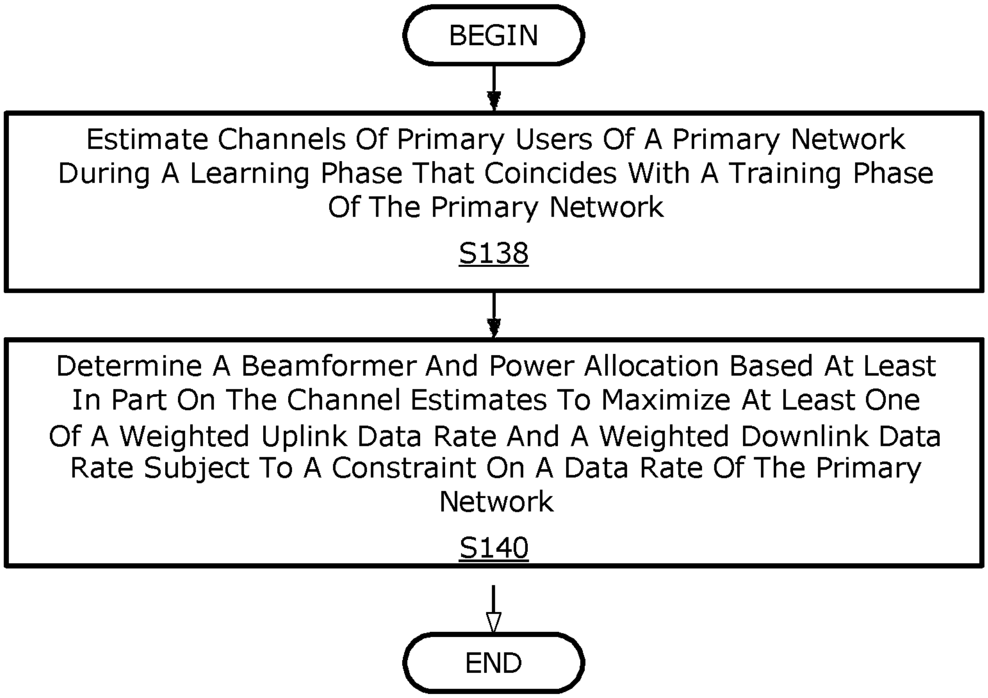
FIG. 12 is a flowchart of another example process in a network node for spectrum sharing in massive multiple input multiple output (MIMO) networks.

FIG. 12 is a flowchart of an example process in a network node 16 for spectrum sharing in massive multiple input multiple output (MIMO) networks. One or more blocks described herein may be performed by one or more elements of network node 16 such as by one or more of processing circuitry 68 (including the optimization unit 32), processor 70, radio interface 62 and/or communication interface 60. Network node 16 such as via processing circuitry 68 and/or processor 70 and/or radio interface 62 and/or communication interface 60 is configured to perform channel estimates of primary users of a primary network during a learning phase that coincides with a training phase of a primary network (Block S138). The process also includes determining a beamformer and power allocation based at least in part on the channel estimates to maximize at least one of a weighted uplink data rate and a weighted downlink data rate subject to a constraint on a data rate of the primary network (Block S140).

Having described the general process flow of arrangements of the disclosure and having provided examples of hardware and software arrangements for implementing the processes and functions of the disclosure, the sections below provide details and examples of arrangements for spectrum sharing in massive multiple input multiple output (MIMO) networks.

Figure 13:
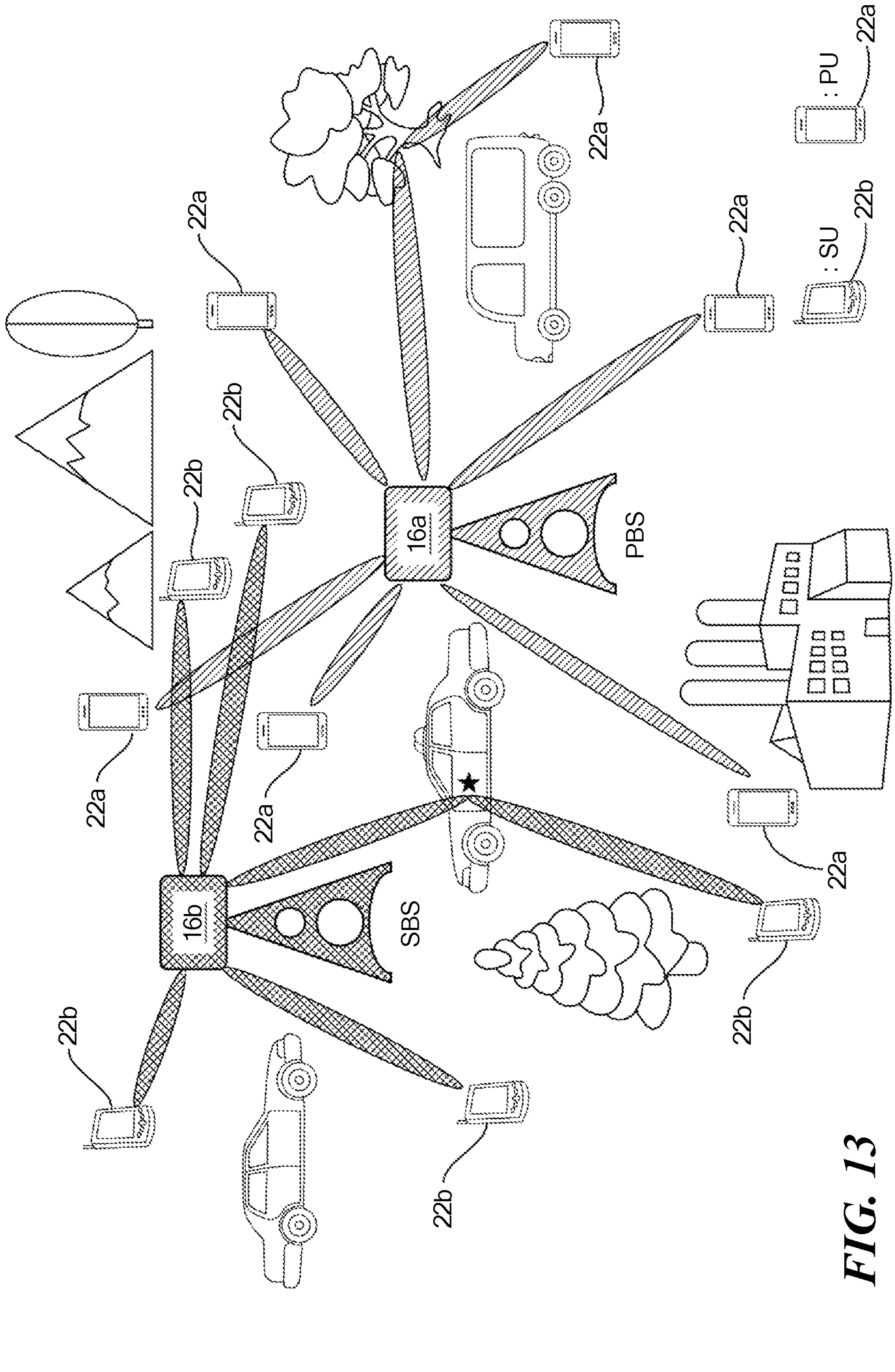
FIG. 13 is a communications network having a primary network and a secondary network.

An example of one embodiment of a communication network configured according to principles disclosed herein is illustrated in FIG. 13, where:

- The single-cell PN and the single-cell SN simultaneously operate in the same RF band;
- The PN includes:
  - $N_p$ single-antenna PUs 22*a;*
  - A PBS 16*a* with a massive number of antennas denoted as $M_p$ ($M_p$>>$N_p$);
- The SN includes:
  - $N_s$ single-antenna SUs 22*b;*
  - An SBS 16*b* with a massive number of antennas denoted as $M_s$ ($M_s$>>$N_s$+$N_p$): this constraint enables the SBS 16*b* to have enough degrees of freedom to serve the SUs 22*b* by working in the PN's spatial spectrum holes;
- Both the PBS 16*a* and SBS 16*b* employ beamforming technologies to serve their own users;
- The PBS 16*a* provides the SBS 16*b* with information about the PUs' pilots;
- UL and DL channels in both networks are assumed to be reciprocal;
- Channels are frequency flat-fading;
- The numbers of PUs 22*a* and SUs 22*b* can be different at UL and DL phases in each communication frame. As noted above, the coverage areas of the PN and the SN may at least partially overlap.

Communication Frame Structure

Figure 14:
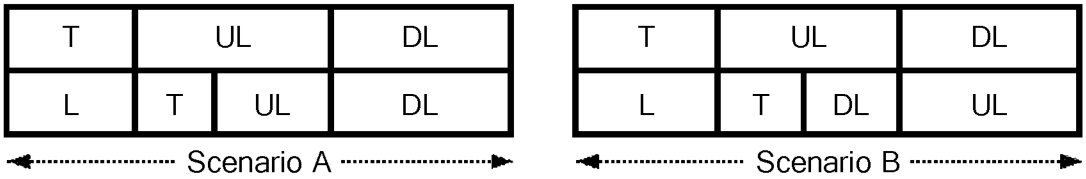
FIG. 14 is an illustration of a communication frame for Scenario A and for Scenario B.

Consider F coherent communication time frames, where the channels of all possible links of the two networks are assumed to be semi-static over the frame period. Using these coherent frames, the estimation of the required CSI at the SN nodes may be improved. At each frame, consider the TDD communication mode in both the PN and the SN. In the PN network, each communication frame includes three modes, namely the training mode, the UL mode; and the DL mode. Assume that the SN is aware of the PN communication time frame, and thus, aligns its time frames with those of the PN. Two different network co-existence schemes are considered, namely Scenario A (a modified TDD mode) and Scenario B (a modified rTDD mode), as shown in FIG. 14. The training phases of both networks are carried out in the UL mode, meaning that the PUs 22*a* and SUs 22*b* transmit pilots to their corresponding base stations, and then, the PBS 16*a* and SBS 16*b* estimate the channels of the users. As can be seen in FIG. 14, when the PN is in training mode ("T"), the SN remains quiet i.e., the SN is in the learning phase ("L"). The learning phase may be to avoid the pilot contamination between the two networks and enable the SBS 16*b* to estimate the channels of the SUs 22*b* along with those of the PN nodes without the PN's cooperation. Therefore, the training in the SN may coincide with data exchange in the PN. Hence, in both scenarios, the SN training is performed during the PN UL interval. In Scenario A, the SN UL follows the SN training, and the SN DL coincides with the PN DL. In Scenario B, the SN DL happens right after the SN training, and the SN UL is performed during the PN DL. Communication schemes for these two scenarios are disclosed herein.

Assumptions a) Assume no CSI exchange between the PN and the SN. In other words, each network is responsible for its CSI acquisition. The required CSI is obtained at the SN nodes during the learning phase;
b) Without loss of generality, assume that the PBS 16*a* employs the conventional ZF beamformer in both UL and DL phases. Nevertheless, it is worth mentioning that the methods can be employed for other beamforming techniques used by the PN;
c) The PN performs training and designs its parameters, such as beamformers and the powers allocated to the PUs 22*a*, without taking the SN presence into account. Therefore, the presence of the SN may have as minimal effect as possible on the PN operation;
d) The PN provides the SN with the total and individual power budgets of the PN nodes. Also, the PN shares the required QoS of its nodes with the SN to be guaranteed.
e) In order to control the interference caused by the SUs 22*b* to the PBs 16*a* in the SN training phase, assume that the training powers of the SUs 22*b* may be different (usually lower) from their UL powers. In fact, some embodiments may not be affected by the SN training technique.

Optimization Problem and an Example Method in Scenario A

The performance of Scenario A (TDD) in terms of maximizing the total UL and DL data rate of the SN may be examined while considering the power budgets of the SN nodes (SBS 16*b* and SUs 22*b*) and satisfying the given data rates of the PUs 22*a*. The total data rate of the SN is herein defined as a weighted combination of the SN UL and DL sum-rates. Denoting $R_2$ and $\tilde{R}_2$ as the sum-rates of the SN in UL and DL, respectively, a considered optimization problem (OP) in Scenario A may be formulated as follows:

Optimization Problem (1)

$$\max_{W_2, \tilde{W}_2, p_2, \tilde{p}_2} \beta R_2(W_2, p_1, p_2) + \tilde{\beta}\, \tilde{R}_2(W_1, \tilde{W}_2, \tilde{p}_1, \tilde{p}_2) \quad (1)$$

$$C_1:\ 0 \le p_{2,k} \le p_{2,max}, \quad \text{for } k = 1, 2, \ldots, N_s$$

$$C_2:\ R_{1,l}(W_1, p_1, p_2) \ge r_{1,l}, \quad \text{for } l = 1, 2, \ldots, N_p$$

$$C_3:\ \|\tilde{w}_{2,k}\|^2 = 1, \quad \text{for } k = 1, 2, \ldots, N_s$$

$$C_4:\ 1^T \tilde{p}_2 \le \tilde{P}_2,$$

$$C_5:\ \tilde{R}_{1,l}(W_1, \tilde{W}_2, \tilde{p}_1, \tilde{p}_2) \ge \tilde{r}_{1,l}, \quad \text{for } l = 1, 2, \ldots, N_p$$

$$C_6:\ \tilde{p}_{2,k} \ge 0, \quad \text{for } k = 1, 2, \ldots, N_s.$$

where:

- $\beta$ and $\tilde{\beta}$ are two positive constant coefficients and can be chosen depending on whether the SN UL or DL has greater priority;
- $W_2$ and $\tilde{W}_2$ are the beamforming matrices employed by the SBS 16*b* at the UL and the DL phases, respectively;
- $W_1$ is the ZF beamforming matrix used by the PBS 16*a* in both UL and DL phases;

where:

- $p_2=[p_{2,1}\ p_{2,2} \ldots p_{2,N_s}]$ and $\tilde{p}_2=[\tilde{p}_{2,1}\ \tilde{p}_{2,2} \ldots \tilde{p}_{2,N_s}]$ are the power adjusting vectors of the SUs 22*b* at the UL and DL phases, respectively. $p_{2,k}$ $$\tilde{R}_1 R_{1,l}(W_1, p_1, p_2) = \frac{1}{N_{up}} \sum_{t=1}^{N_{up}} \log_2(1 + \gamma_{1,l}(t))$$

and $\tilde{p}_{2,k}$ are the power transmitted by and allocated to the k-th SU in the UL and DL, respectively;

- $p_1$ and $\tilde{p}_1$ are the power adjusting vectors of the PUs 22*a* at the UL and DL phases, respectively;
- $R_{1,l}$ and $\tilde{R}_{1,l}$ are the data rates of the l-th PU 22*a* in the UL and DL phases, respectively. Denoting $\gamma_{1,l}(t)$ and $\tilde{\gamma}_{1,l}(t)$ as the signal-to-interference-plus-noise ratio of the l-th PU 22*a* in UL and DL, respectively, where $N_{up}$ and $N_{dp}$ represent the lengths of the UL and DL intervals of the PN, respectively, and:

- $r_{1,l}$ and $\tilde{r}_{1,l}$ are the given data rates that should be satisfied by the SN for the l-th PU 22*a* in the UL and DL phases, respectively;
- $p_{2,max}$ and $\tilde{P}_2$ are the maximum transmit power of each SU and the total transmit power of the SBS 16*b* in DL; and.
- $\tilde{w}_{2,k}$ is the unit-norm beamforming weight vector used by the SBS 16*b* to serve the k-th SU in DL.

In the OP (1), constraints $C_1$, $C_3$, $C_4$ and $C_6$ are considered with regard to the SN power budgets. Also, Constraints $C_2$ and $C_5$ are considered to ensure that the SN meets the required PN QoS. The optimization problems of the UL and DL sum-rates can be separated into two independent optimization problems as follows:

Optimization Problem (2)

$$\max_{W_2, p_2} R_2(W_2, p_1, p_2) \quad (2)$$

s.t.

$$C_1:\ 0 \le p_{2,k} \le p_{2,max}, \quad \text{for } k = 1, 2, \ldots, N_s$$

$$C_2:\ R_{1,l}(W_1, p_1, p_2) \ge r_{1,l}, \quad \text{for } l = 1, 2, \ldots, N_p.$$

Optimization Problem (3)

$$\max_{\tilde{W}_2, \tilde{p}_2} R_2(W_1, \tilde{W}_2, \tilde{p}_1, \tilde{p}_2) \quad (3)$$

s.t.

$$C_3:\ \|\tilde{w}_{2,k}\|^2 = 1, \quad \text{for } k = 1, 2, \ldots, N_s$$

$$C_4:\ 1^T \tilde{p}_2 \le \tilde{P}_2,$$

$$C_5:\ \tilde{R}_{1,l}(W_1, \tilde{W}_2, \tilde{p}_1, \tilde{p}_2) \ge \tilde{r}_{1,l}, \quad \text{for } l = 1, 2, \ldots, N_p$$

$$C_6:\ \tilde{p}_{2,k} \ge 0, \quad \text{for } k = 1, 2, \ldots, N_s.$$

and

SN UL: Solving the OP (2), which corresponds to the UL, is challenging in practice as it requires the knowledge of the effective channel coefficients of the PBS-SUs 22*b* links. To obtain such knowledge, a DL training may be performed by the PBS 16*a*, thereby increasing the cooperation of the PN with the SN. Such a DL training degrades the PN spectral efficiency. To tackle this issue, an approximation for the required CSI may be obtained by exploiting the learning phase. This approximation may result in problem infeasibility. To overcome this issue, the constraints on the PU data rates may be tightened. To have a computationally affordable solution while maximizing the SN UL sum-rate, a modified ZF beamformer is used such that the SBS 16*b* can nullify the signals of the Pus 22*a*. Although this ZF type beamformer has been considered for DL transmission, here modified zero forcing (MZF) for UL transmission may be considered as well. An advantage of the MZF is that it enables the SBS 16*b* to protect itself from the interference caused by the PUs 22*a*. Exploiting this MZF, the optimal transmit powers of the SUs 22*b* can be found. An example solution to the SN UL OP (2) in Scenario A is summarized in Algorithm I, as follows.

Algorithm I: Solving SN UL OP in Scenario

1) Obtain CSI of SBS-PUs links in the learning phase;
2) Approximate the effective CSI of PBS-SUs links in the learning phase;
3) Obtain CSI of SBS-SUs links in the SN training phase;
4) Concatenate the SBS-SUs and SBS-PUs channel vectors as a matrix;
5) Calculate the conventional ZF based on the resultant matrix of Step 4;
6) Choose the first $N_s$ columns of the resultant matrix of Step 5;
7) Plug the outputs of Steps 2 and 6 into the OP (2);
8) Increase the PU's rates thresholds, $r_{1,l}$ and $\tilde{r}_{1,l}$, until having a feasible set for the OP of Step 7; and/or
9) Solve numerically the convex OP of Step 7 using the interior-point methods.

SN DL: Solving the OP (3) is challenging in practice as it requires the knowledge of the effective channel coefficients of the PBS-PUs links. Being known at the PBS 16*a*, these coefficients may not be assumed to be known at the SBS 16*b* in practice. Thus, constraint $C_5$ may be tightened such that the SBS 16*b* completely protects the PUs 22*a* in lieu of guaranteeing given data rates of them. This tightened constraint enables the SBS 16*b* to work in spatial spectrum holes of the PN. To this end, a ZF type beamformer may be employed such that the SBS 16*b* maximally serves the SUs 22*b* while protecting the PUs 22*a*. To have a reliable power allocation scheme, the DL beamforming weights may be configured with unit power. By obtaining beamformers in the OP (3), an optimal power allocation strategy using the conventional water-filling algorithm may be employed. Based on this solution, the SBS 16*b* may allocate more power to the SUs 22*b* having stronger channels, leading to a maximum achievable sum-rate of the network. A solution to the SN DL OP in Scenario A is summarized in Algorithm II.

Algorithm II: Solving SN DL OP in Scenario A

1) Obtain CSI of SBS-PUs links in the learning phase;
2) Obtain CSI of SBS-SUs links in the SN training phase;
3) Calculate co-kernel of the SBS-PUs channels matrix;
4) Multiply the Hermitian of SBS-SUs channels matrix by the output of Step 3 from the right;
5) Calculate the pseudoinverse of the resultant matrix of Step 4;
6) Multiply the outputs of Steps 3 and 5;
7) Normalize the columns of the resultant matrix;
8) Plug the output of Step 7 into the OP (3); and/or
9) Solve the convex OP of Step 8 by the water-filling algorithm.

Optimization Problem and an Example Method in Scenario B

Similar to Scenario A, the performance of Scenario B may be analyzed in terms of maximizing the total data rate of the SN while considering the SN power budgets and satisfying the given data rates of the PUs 22*a*. The OP in Scenario B may be formulated as:

Optimization Problem (4)

$$\max_{W_2, \tilde{W}_2, p_2, \tilde{p}_2} \beta R_2(W_1, W_2, \tilde{p}_1, p_2) + \tilde{\beta}\, \tilde{R}_2(\tilde{W}_2, p_1, \tilde{p}_2) \tag{4}$$

s.t.

$$C_1:\ 0 \le p_{2,k} \le p_{2,max}, \quad \text{for } k = 1, 2, \ldots, N_s$$

$$C_2:\ R_{1,l}(W_1, \tilde{W}_2, p_1, \tilde{p}_2) \ge r_{1,l}, \quad \text{for } l = 1, 2, \ldots, N_p$$

$$C_3:\ \|\tilde{w}_{2,k}\|^2 = 1, \quad \text{for } k = 1, 2, \ldots, N_s$$

$$C_4:\ 1^T \tilde{p}_2 \le \tilde{P}_2,$$

$$C_5:\ \tilde{R}_{1,l}(W_1, \tilde{p}_1, p_2) \ge \tilde{r}_{1,l}, \quad \text{for } l = 1, 2, \ldots, N_p$$

$$C_6:\ \tilde{p}_{2,k} \ge 0, \quad \text{for } k = 1, 2, \ldots, N_s.$$

In the OP (4), Constraints $C_1$, $C_3$, $C_4$ and $C_6$ are considered with regard to the SN power budgets. Also, Constraints $C_2$ and $C_5$ are considered to ensure that the SN meets the required PN QoS. The optimization problems of the UL and DL sum-rates can be separated into two independent optimization problems as follows:

Optimization Problem (5)

$$\max_{W_2, p_2} R_2(W_1, W_2, \tilde{p}_1, p_2) \tag{5}$$

s.t.

$$C_1:\ 0 \le p_{2,k} \le p_{2,max} \quad \text{for } k = 1, 2, \ldots, N_s$$

$$C_5:\ R_{1,l}(W_1, p_1, p_2) \ge r_{1,l}, \quad \text{for } l = 1, 2, \ldots, N_p.$$

Optimization Problem (6)

$$\max_{\tilde{W}_2, \tilde{p}_2} \tilde{R}_2(\tilde{W}_2, \tilde{p}_1, \tilde{p}_2) \tag{6}$$

s.t.

$$C_2:\ R_{1,l}(W_1, \tilde{W}_2, p_1, \tilde{p}_2) \ge r_{1,l}, \quad \text{for } l = 1, 2, \ldots, N_p$$

$$C_3:\ \|\tilde{w}_{2,k}\|^2 = 1, \quad \text{for } k = 1, 2, \ldots, N_s$$

$$C_4:\ 1^T \tilde{p}_2 \le \tilde{P}_2,$$

$$C_6:\ \tilde{p}_{2,k} \ge 0, \quad \text{for } k = 1, 2, \ldots, N_s.$$

SN UL: Solving the OP (5) imposes some challenges in practice as it requires the knowledge of the effective channel coefficients among the SBS's and the PBS's antennas. To obtain this knowledge, the MIMO channel between the SBS 16*b* and the PBS 16*a* may be estimated at the SBS 16*b*. However, the PBS 16*a* is not meant to perform any DL training. In addition, the PBS 16*a* should provide the SBS 16*b* with the knowledge of its beamformers, which puts an additional undesired burden on the PN. To tackle this issue, the SBS 16*b* beamformers are configured to cancel the interference caused by the PBS 16*a* to the SBS 16*b*. To this end, the column-space of the MIMO channel matrix is used instead of the whole matrix. The UL beamforming matrix may be configured by avoiding the column-space of the MIMO channel matrix. This sub-space can be estimated during the learning phase. This ZF type beamforming method not only reduces the required cooperation of the PN with the SN, but also, maximizes the achievable sum-rate of the SN by increasing the SBS's degrees of freedom. Using the beamforming matrix, the optimal transmit powers of the SUs 22*b* can be found through a convex OP. Our solution to the SN UL OP in Scenario B is summarized in Algorithm III.

Algorithm III: Solving SN UL OP in Scenario B

1) Obtain subspace of MIMO channel matrix in the learning phase;
2) Obtain CSI of SBS-SUs links in the SN training phase;
3) Calculate cokernel of the output of Step 1;
4) Multiply the Hermitian of SBS-SUs channels matrix by the output of Step 3 from the right;
5) Calculate the pseudoinverse of the resultant matrix of Step 4;
6) Multiply the outputs of Steps 3 and 5;
7) Plug the output of Step 6 into the OP (5); and/or
8) Solve numerically the convex OP of Step 7 using the interior-point methods.

Comparing Algorithms I and III, the UL phase of the SN, Scenario B outperforms Scenario A in terms of computational complexity and mathematical tractability.

SN DL: To solve the OP (6), the same challenges are posed as in OP (5). Therefore, similar to the UL, the subspace-based ZF beamformer for the DL is used. However, to achieve a reliable power adjusting scheme, the DL beamformers are configured with unit power. Using these beamformers, the SN DL power allocation scheme can be optimally found by a fast water-filling algorithm. A solution to the SN DL OP in Scenario B is summarized in Algorithm IV.

Algorithm IV: Solving SN DL OP in Scenario B

1) Obtain subspace of MIMO channel matrix in the learning phase;
2) Obtain CSI of SBS-SUs links in the SN training phase;
3) Calculate cokernel of the output of Step 1;
4) Multiply the Hermitian of SBS-SUs channels matrix by the output of Step 3 from the right;
5) Calculate the pseudoinverse of the resultant matrix of Step 4;
6) Multiply the outputs of Steps 3 and 5;
7) Normalize the columns of the resultant matrix;
8) Plug the output of Step 7 into the OP (6); and/or
9) Solve the convex OP of Step 8 by the water-filling algorithm.

Some embodiments may include one or more of the following:

Embodiment A1. A secondary network node in a secondary network, the secondary network node configured to communicate with a plurality of secondary users, the secondary network node configured to, and/or comprising a radio interface and/or comprising processing circuitry configured to:

during a learning phase that coincides with a training phase of a primary network, estimate channels of primary users of the primary network; and determine a beamformer and power allocation to maximize at least one of a weighted uplink data rate and a weighted downlink data rate subject to a constraint on a data rate of the primary network, determining the beamformer and power allocation being based at least in part on the channel estimates.

Embodiment A2. The secondary network node of Embodiment A1, wherein the secondary network node, radio interface and/or processing circuitry are further configured to perform reverse time division duplexing, rTDD.

Embodiment A3. The secondary network node of any of Embodiments A1 and A2, wherein determining the beamformer and power allocation is based at least in part on information about a subspace of a channel matrix corresponding to a channel between the primary network and the secondary network.

Embodiment A4. The secondary network node of any of Embodiments A1-A3, wherein determining the beamformer and power allocation includes determining a power allocation based at least in part on performing a convex optimization procedure.

Embodiment A5. The secondary network node of Embodiment A4, wherein determining the power allocation includes performing a water-filling procedure Embodiment A6. The secondary network node of any of Embodiments A1-A5, wherein determining a beamformer and power allocation is performed without downlink training.

Embodiment A7. The secondary network node of any of Embodiments A1-A6, wherein maximizing at least one of a weighted uplink data rate and a weighted downlink data rate is based at least in part on information about spectrum holes of the primary network.

Embodiment A8. The secondary network node of any of Embodiments A1-A7, wherein maximizing at least one of a weighted uplink data rate and a weighted downlink data rate is performed subject to a constraint on interference by primary users of the primary network.

Embodiment A9. The secondary network node of any of Embodiments A1-A8, wherein maximizing at least one of a weighted uplink data rate and a weighted downlink data rate is performed subject to a constraint on a number of antennas of the secondary network node being greater than a sum of a number of secondary users and primary users.

Embodiment A10. The secondary network node of any of Embodiments A1-A9, wherein estimating and determining is performed without receiving channel information from a primary network node of the primary network.

Embodiment B1. A method implemented in a secondary network node of a secondary network, the secondary network node configured to communicate with a plurality of secondary users, the method comprising:

during a learning phase that coincides with a training phase of a primary network, estimating channels of primary users of the primary network; and determining a beamformer and power allocation to maximize at least one of a weighted uplink data rate and a weighted downlink data rate subject to a constraint on a data rate of the primary network, determining the beamformer and power allocation being based at least in part on the channel estimates.

Embodiment B2. The method of Embodiment B1, further comprising performing reverse time division duplexing, rTDD.

Embodiment B3. The method of any of Embodiments B1 and B2, wherein determining the beamformer and power allocation is based at least in part on information about a subspace of a channel matrix corresponding to a channel between the primary network and the secondary network.

Embodiment B4. The method of any of Embodiments B1-B3, wherein determining the beamformer and power allocation includes determining a power allocation based at least in part on performing a convex optimization procedure.

Embodiment B5. The method of Embodiment B4, wherein determining the power allocation includes performing a water-filling procedure.

Embodiment B6. The method of any of Embodiments B1-B5, wherein determining a beamformer and power allocation is performed without downlink training.

Embodiment B7. The method of any of Embodiments B1-B6, wherein maximizing at least one of a weighted uplink data rate and a weighted downlink data rate is based at least in part on information about spectrum holes of the primary network.

Embodiment B8. The method of any of Embodiments B1-B7, wherein maximizing at least one of a weighted uplink data rate and a weighted downlink data rate is performed subject to a constraint on interference by primary users of the primary network.

Embodiment B9. The method of any of Embodiments B1-B8, wherein maximizing at least one of a weighted uplink data rate and a weighted downlink data rate is performed subject to a constraint on a number of antennas of the secondary network node being greater than a sum of a number of secondary users and primary users.

Embodiment B10. The method of any of Embodiments B1-B9, wherein estimating and determining is performed without receiving channel information from a primary network node of the primary network.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

APAR Average per-user achievable rate
DL Downlink
FDD Frequency-division duplexing
MF Matched filter
OP Optimization problem
PBS Primary base station
PN Primary network
PU Primary user
QoS Quality of service
rTDD Reverse time-division duplexing
SBS Secondary base station
SN Secondary network
SU Secondary user
TDD Time-division duplexing
UL Uplink
USS Underlay spectrum sharing
WD Wireless device
ZF Zero-forcing It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A secondary network node in a secondary network, the secondary network node comprising processing circuitry configured to:

perform channel estimates for primary users of a primary network during a learning phase that coincides with a training phase of the primary network; and determine a beamformer and power allocation based at least in part on the channel estimates to maximize at least one of a weighted uplink data rate and a weighted downlink data rate subject to a constraint on a data rate of the primary network.

2. The secondary network node of claim 1, wherein the processing circuitry is further configured to perform reverse time division duplexing, rTDD.

3. The secondary network node of claim 1, wherein determining the beamformer and power allocation is based at least in part on information about a subspace of a channel matrix corresponding to a channel between the primary network and the secondary network.

4. The secondary network node of claim 1, wherein determining the beamformer and power allocation includes determining the power allocation based at least in part on performing a convex optimization procedure.

5. The secondary network node of claim 4, wherein determining the power allocation includes performing a water-filling procedure.

6. The secondary network node of claim 1, wherein determining the beamformer and power allocation is performed without downlink training.

7. The secondary network node of claim 1, wherein maximizing at least one of the weighted uplink data rate and the weighted downlink data rate is based at least in part on information about spectrum holes of the primary network.

8. The secondary network node of claim 1, wherein maximizing at least one of the weighted uplink data rate and the weighted downlink data rate is performed subject to a first constraint on interference by primary users of the primary network.

9. The secondary network node of claim 1, wherein maximizing at least one of the weighted uplink data rate and the weighted downlink data rate is performed subject to a second constraint on a number of antennas of the secondary network node being greater than a sum of a number of secondary users and primary users.

10. The secondary network node of claim 1, wherein estimating and determining is performed without receiving channel information from a primary network node of the primary network.

11. A method implemented in a secondary network node of a secondary network, the secondary network node configured to communicate with a plurality of secondary users, the method comprising:

performing channel estimates for primary users of a primary network during a learning phase that coincides with a training phase of the primary network; and determining a beamformer and power allocation based at least in part on the channel estimates to maximize at least one of a weighted uplink data rate and a weighted downlink data rate subject to a constraint on a data rate of the primary network.

12. The method of claim 11, further comprising performing reverse time division duplexing, rTDD.

13. The method of claim 11, wherein determining the beamformer and power allocation is based at least in part on information about a subspace of a channel matrix corresponding to a channel between the primary network and the secondary network.

14. The method of claim 11, wherein determining the beamformer and power allocation includes determining a power allocation based at least in part on performing a convex optimization procedure.

15. The method of claim 14, wherein determining the power allocation includes performing a water-filling procedure.

16. The method of claim 11, wherein determining a beamformer and power allocation is performed without downlink training.

17. The method of claim 11, wherein maximizing at least one of the weighted uplink data rate and the weighted downlink data rate is based at least in part on information about spectrum holes of the primary network.

18. The method of claim 11, wherein maximizing at least one of the weighted uplink data rate and the weighted downlink data rate is performed subject to a first constraint on interference by primary users of the primary network.

19. The method of claim 11, wherein maximizing at least one of the weighted uplink data rate and the weighted downlink data rate is performed subject to a second constraint on a number of antennas of the secondary network node being greater than a sum of a number of secondary users and primary users.

20. The method of claim 11, wherein estimating and determining is performed without receiving channel information from a primary network node of the primary network.

* * * * *